July 4, 1950     A. Y. DODGE     2,514,227
TORQUE TRANSMITTING COUPLING

Filed Feb. 9, 1945

Inventor:
Adiel Y. Dodge,
By Dawson, Ooms & Booth
Attorneys.

Patented July 4, 1950

2,514,227

UNITED STATES PATENT OFFICE 2,514,227

TORQUE TRANSMITTING COUPLING

Adiel Y. Dodge, Rockford, Ill.

Application February 9, 1945, Serial No. 576,955

15 Claims. (Cl. 192—104)

This invention relates to torque transmitting couplings and more particularly to overload release couplings for connecting driving and driven shafts.

One of the objects of the invention is to provide a coupling in which minimum drag and wear are produced during overrunning.

A specific object is to provide such a coupling including a plurality of coupling parts unevenly spaced and so arranged that coupling occurs only when the parts register in certain predetermined positions of the driving and driven members. With this construction, the number of impacts occurring during overrunning is minimized to reduce wear and drag.

Another object is to provide a coupling in which a plurality of coupling parts are simultaneously controlled to move into coupling position. Preferably a single spring is employed to control the coupling parts so that a uniform action is obtained.

Still another object is to provide a coupling in which the movement of the coupling parts is damped to reduce impacts. In one desirable construction, a dash pot is provided which affects an actuating ring through which the several coupling parts are simultaneously controlled.

Still another object is to provide a coupling which transmits a greater amount of torque in one direction of rotation than in the other.

A further object is to provide a coupling in which balls are employed as the coupling members and movement of the balls is stabilized. Specifically the balls are mounted for movement in guide passages having angularly related relative flat sides to minimize rolling of the balls under changing forces acting thereon and to increase the number of bearing areas on the balls.

A still further object is to provide a coupling in which the driving and driven members are rotatably connected to maintain their proper relative positions throughout a range of angular misalignment.

The above and other objects and advantages of the invention will be more readily apparent from the following description when read in connection with the accompanying drawing, in which.

Figure 1:
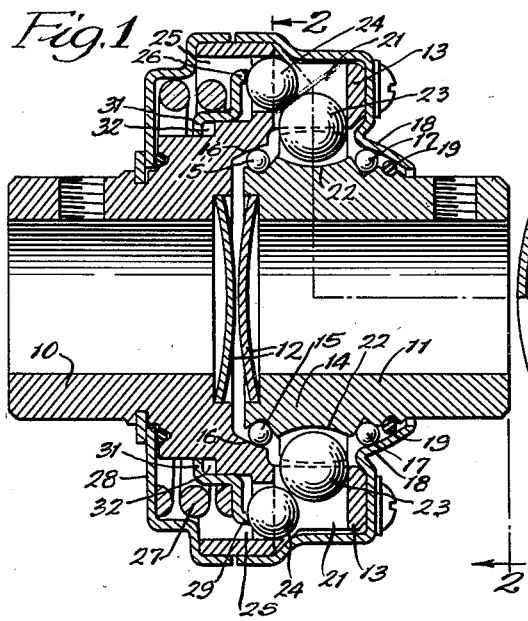
Figure 1 is an axial section with parts in elevation of a coupling embodying the invention.

The coupling, as shown, comprises members 10 and 11 either of which may be the driving member and the other of which may be the driven member. The members 10 and 11 are formed with tubular bores in which shaft sections to be connected may be keyed or splined and the bores are closed at their inner ends by expansion plugs 12.

The member 10 is formed with an annular portion 13 encircling a hub part 14 on the member 11. The members are rotatably connected by a series of bearing balls 15 mounted in a bearing groove on the hub portion 14 and engaging a circumferential bearing portion 16 on the part 13 of the member 10. A second series of bearing balls 17 similarly mounted in a groove of the hub 14 engage a circumferential skirt portion 18 on a cover plate detachably connected to the part 13 by screws or the like. Preferably an annular seal 19 engages the skirt portion 18 beyond the bearing balls 17 to prevent leakage of lubricant from the coupling unit. With this construction, the members 10 and 11 are connected to rotate freely relative to each other while angular misalignment therebetween is permitted within the range of movement provided for the size of the circumferential bearing surfaces 16 and 18.

To connect the members 10 and 11 for transmission of torque therebetween, the part 13 is formed with a plurality of substantially radial guide passages 21 and the hub portion 14 is formed with a complementary series of cam notches 22. Coupling members shown as balls 23 are mounted in the passages 21 for radial movement toward and away from the notches 22.

The balls 23 are adapted to be moved toward the notches by cam members shown as balls 24 which are movably mounted in cam bores 25 in the part 13 of member 10. The cam balls 24 are urged toward the balls 23 by means of an annular ring 26 mounted on the member 10 for axial sliding movement thereon and urged toward the balls by a coil spring 27 encircling the member 10. The spring may engage a cover part 28 detachably secured to the member 10 and fitting over the part 13 completely to enclose the coupling mechanism.

According to one feature of the present invention, the passages 21 and cam notches 22 are unevenly spaced around the periphery of the members so that they will register only in certain predetermined relative positions of the members. As shown, the passages and notches are arranged in three groups of three evenly spaced within the groups and with the spacing between the groups greater than the spacing of the passages or notches within the groups. With this arrangement nine coupling balls are provided which can connect the members in only three relative positions of rotation so that during overrunning only three impacts per revolution are produced instead of nine. This operation is made possible in addition to the construction just described by control of the several balls through a common actuating ring so that no one of the balls can be forced into engagement with a cam notch until all of the balls are in register with the notches. It will be seen that if any one of the balls 23 is out of register with a notch, the ring 26 will be held to the left as seen in Figure 1 so that no pressure can be exerted on any of the cam members to urge the balls toward the notches. It will also be noted that the cam balls 23 and the coupling balls 24 change their relative cam angle as the balls 23 move out toward a disengaged position so that a lesser force is exerted on the balls 23 to urge them toward the notches when they are in their disengaged position than when they are in engagement with the notches. This construction together with the irregular spacing of the guide passages and notches reduces drag and wear to a minimum during overrunning of the coupling.

As seen in Figure 1, the ring 26 is formed with an axially projecting flange 29 which engages the balls 24 at points radially beyond their centers. With this arrangement the force exerted on the balls 24 by the ring acts at an angle sloping radially inward toward the balls 23 so that the forces on the balls 24 exerted by the ring and the balls 23 are more nearly balanced. This arrangement reduces the reactionary load of the balls 24 against the sides and particularly against the outer surfaces of the bores 25 so that the frictional effect between the balls 24 and the bores 25 is minimized. This arrangement permits the balls 24 to be moved freely in the bores so that the desired control operations can be produced with a minimum interference due to frictional effects and so that the operation of the mechanism will be more uniform under successive release and re-engagement operations.

According to another feature of the invention, the operation of the cam and coupling balls is damped to minimize the impact effect during overrunning and to stabilize operation of the coupling. For this purpose, the ring 26 is formed with an inwardly turned flange 31 having a sliding fit against a reduced diameter portion of the member 10. This construction provides an annular space 32 within the ring 26 which is confined between two slidably interfitting surfaces. During movement of the ring, either air or lubricant will be pumped into or out of the space 32 so that it acts as a dash pot yieldingly opposing rapid movement of the ring. During overrunning this dash pot effect tends to hold the ring against rapid movements toward engaging position, so that the balls will not be moved into engagement with the notches except at low rates of slip between members 10 and 11.

In using balls such as the balls 23 as coupling members, they are subjected to axial forces exerted thereon by the cam members 24 and to circumferential forces exerted thereon by the notches 22. When such balls are mounted in circular passages which must necessarily be at least slightly larger in diameter than the balls, the forces resolve themselves into a resultant force which will roll the balls around the passages to a radial position depending upon the balance between the two forces involved. Any slight change in the balance between the forces will cause the balls to roll and any misalignment between the coupling members will under these conditions cause a substantially constant rolling movement of the balls. Since the balls may, at any given instant, occupy different relative positions in their respective bores, the coupling torque load may not be uniformly divided among the balls so that the coupling will not always disengage under the same load conditions.

Figure 3:
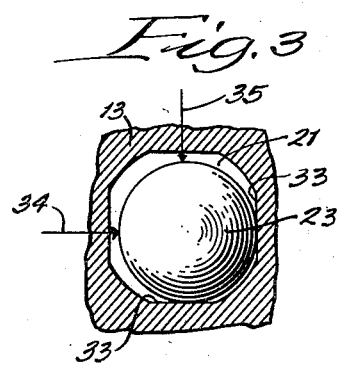
Figure 3 is an enlarged partial section on the line 3—3 of Figure 2.

In order to eliminate these difficulties, the passages 21 are formed as shown in Figure 3 by broaching or like operations with a plurality of substantially flat sides 33 against which the balls 23 may bear. The axial force exerted on the balls 23, as indicated by the arrow 34, tends to urge the balls against one of the flat sides 33 while the circumferential force exerted on the balls by the notches 22 as indicated by the arrow 35 urges the balls against an adjacent flat side. It will be seen that with this construction, any change in the balance of the forces will not cause movement of the balls since their position is fixed by the flat surfaces 33 except under an actual reversal of the forces involved. All of the balls will, therefore, occupy uniform positions under various operating conditions so that rolling of the balls in the guide passages is eliminated and so that the load forces may be uniformly distributed among the balls under all operating conditions. It will also be noted that with this construction the balls bear against two bearing surfaces in the guide passages rather than against a single surface as when a cylindrical passage is employed so that greater effective bearing area is provided.

Figure 4:
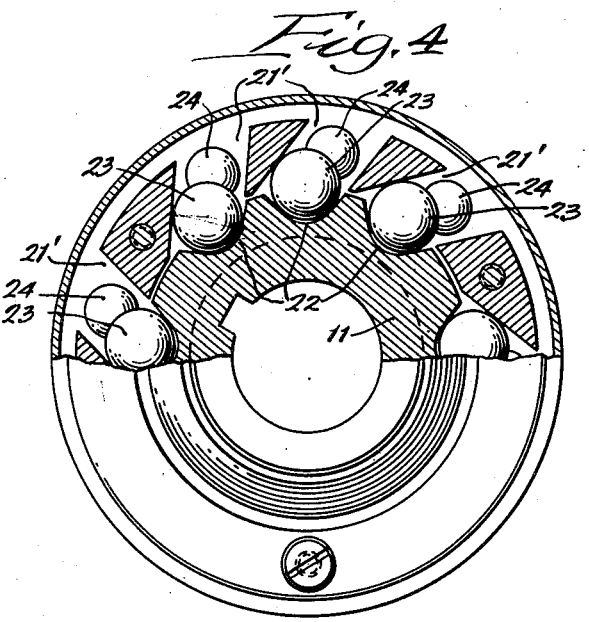
Figure 4 is a view similar to Figure 2 showing an alternative construction.

In the construction shown in Figure 4, the coupling parts are arranged to transmit greater torque before releasing in one direction of rotation than in the other. This construction is substantially identical in all respects with that shown in Figures 1 to 3 except that the guide passages, as shown at 21', are formed at angles circumferentially to radii passing through them. With this construction when the member 11 tends to rotate clockwise relative to the member 10, the notches 22 exert a force substantially parallel to the axis of the passages 21' on the balls 23 so that they will be moved outwardly under a relatively light torque load. When, however, the member 11 tends to turn counter-clockwise relative to the member 10, the notches 22 will act through the balls 23 against the sides of the passages 21 at an angle approaching a right angle so that the resultant force acting on the balls to move them outwardly into the passages is a relatively small portion of the torque load. Therefore, a relatively high load will be transmitted by the coupling before the balls 23 are cammed outwardly in the passages 21' to interrupt the connection between the members 10 and 11. In other respects, the construction of Figure 4 is substantially identical to that of Figures 1 to 3 and functions in the same manner.

The arrangement shown in Figure 4 is capable of transmitting heavy torque loads from part number 10 to part 11 in a clockwise direction and only a relatively light torque load in the same direction from part 11 to and thru part 10. This arrangement furnishes characteristics resembling a one way clutch.

Figure 2:
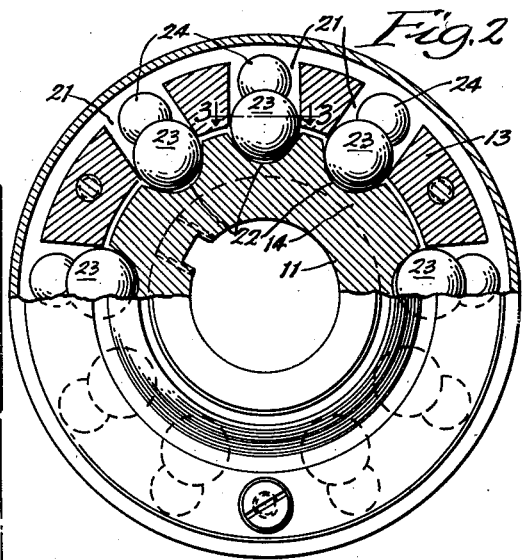
Figure 2 is a section on the broken line 2—2 of Figure 1.
Figure 5:
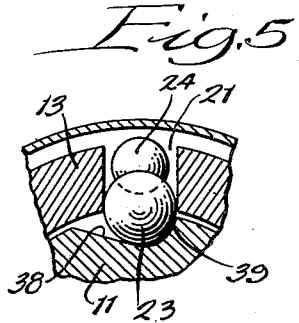
Figure 5 is a partial section of a further alternative construction.

The construction of Figure 5 may also be used when it is desired to transmit more torque in one direction than in the other, parts in this figure corresponding to like parts in Figures 1 and 2 being indicated by the same reference numerals. As shown, the symmetrical notches 22 of Figure 2 are replaced by notches having sloping surfaces 38 and 39 lying at different angles. The surfaces 38 are relatively flat to exert a greater radial force on the balls 23 in response to a given torque load than the surfaces 39 which are more nearly radial. Thus when the member 11 tends to turn clockwise a lesser torque will be required to cam the balls 23 out than when member 11 tends to turn counter-clockwise. In this construction, as well as in that of Figure 4, the opposite sides of the notches lie at different angles to the passage axes so that one side of the notches exerts a greater camming effect on the balls than the other.

While several embodiments of the invention have been shown and described in detail, it will be understood that these are illustrative only and are not intended as a definition of the scope of the invention, reference being had for this purpose to the appended claims.

What is claimed is:

1. A torque transmitting coupling comprising rotable driving and driven members, one of the members being formed in its periphery with a series of outwardly facing cam notches, the other member being formed with a series of outwardly extending guide passages, the notches and guide passages being spaced at unequal intervals circumferentially of the members, coupling members movably mounted in the passages to engage the notches, cam members carried by said other of the members and movable in paths an angles to the guide passages to engage the coupling members respectively, an annular ring engaging the cam members, and spring means urging the ring toward the coupling members.

2. A torque transmitting coupling comprising rotatable driving and driven members, one of the members being formed in its periphery with a series of outwardly facing cam notches, the other member being formed with a series of outwardly extending guide passages, the notches and guide passages being spaced circumferentially in groups which are spaced apart different distances than the notches and passages in a group, coupling members mounted in the passages for movement into and out of engagement with the notches, and resilient means urging the coupling members into engagement with the notches.

3. A torque transmitting coupling comprising rotatable driving and driven members, one of the members being formed in its periphery with a series of outwardly facing cam notches, the other member being formed with a series of outwardly extending guide passages, the notches and guide passages being spaced circumferentially in groups which are spaced apart different distances than the notches and passages in a group, balls movably mounted in the guide passages to engage the notches, said other member being formed with a series of cam bores intersecting the passages respectively, cam balls in the bores engaging the first named balls to urge them toward the notches, and resilient means urging the cam balls toward the first named balls.

4. A torque transmitting coupling comprising rotatable driving and driven members, one of the members being formed in its periphery with a series of outwardly facing cam notches, the other member being formed with a series of outwardly extending guide passages, the notches and guide passages being spaced circumferentially in groups which are spaced apart different distances than the notches and passages in a group, balls movably mounted in the guide passages to engage the notches, said other member being formed with a series of cam bores intersecting the passages respectively, cam balls in the bores engaging the first named balls to urge them toward the notches, an annular ring engaging the cam balls, and a spring urging the ring toward the first named balls.

5. A torque transmitting coupling comprising driving and driven members arranged coaxially with one member having a part encircling a hub portion on the other member, said part being formed with a plurality of outwardly extending guide passages and said hub portion being formed with a plurality of peripheral cam notches, balls movably mounted in the guide passages to engage the notches, said one member being formed with a plurality of cam bores intersecting the passages respectively and lying substantially parallel to the axis of the members, cam balls in the cam bores, an annular ring movably carried by said one member engaging the cam balls, and a spring engaging the ring to urge the cam balls toward the first named balls, and the ring being formed to engage the cam balls at points radially farther from the axis of the members than the ball centers.

6. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, balls movably mounted in the passages to engage the notches and cam members engaging the balls to urge them toward the notches, the passages having angularly connected substantially flat sides against which the balls bear under the forces imposed thereon by the cam members and the notches.

7. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, balls movably mounted in the passages to engage the notches, said one member being formed with cam bores lying substantially parallel to its axis and intersecting the passages respectively, cam balls in the cam bores engageable with the first named balls to urge them toward the notches and spring means urging the cam balls toward the first named balls, the passages having angularly related substantially flat sides against which the first named balls bear under the forces imposed thereon by the notches and the cam balls.

8. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, balls movably mounted in the passages to engage the notches, and resilient means urging the balls toward the notches, the passages lying at an angle measured circumferentially to radii therethrough whereby a greater torque is required to disengage the balls from the notches in one direction of torque than in the other.

9. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, balls movably mounted in the passages to engage the notches, said one member being formed with cam bore substantially parallel with its axis and intersecting the passages respectively, cam members in the bores engaging the balls to urge them toward the notches, an annular ring engaging the cam members, and a spring urging the ring toward the balls, the passages lying at an angle measured circumferentially to radii therethrough.

10. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, a series of bearing units carried by one of the members, the other member being formed with a spherical bearing surface engaging the bearing units to support the members for relative rotation throughout a range of angular misalignment, coupling members in the passages movable into engagement with the notches, and resilient means urging the coupling members toward the notches.

11. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, coupling members slidable in the guide passages and engageable with the notches, and yielding means engaging the coupling members to urge them toward the notches, one side of each of the notches lying at a different angle to the axis of the passages than the other side whereby the coupling will transmit more torque in one direction than in the other.

12. A torque transmitting coupling comprising coaxial driving and driven members, one of the members having a part encircling a hub portion on the other member, said part being formed with a plurality of outwardly extending guide passages and the hub portion being formed with a plurality of peripheral cam notches, coupling members slidable in the guide passages and engageable with the notches, and yielding means engaging the coupling members to urge them toward the notches, the opposite sides of the notches lying at different angles to radii therethrough.

13. A torque transmitting coupling comprising coaxial rotatable driving and driven members, one of the members being formed with circumferentially spaced groups of driving notches with the notches in each group spaced different distances than the groups, the other member being formed with a plurality of guide passages spaced the same as the notches to register with the notches in a number of relative positions equal to the number of groups, coupling members movably mounted in the passages to engage the notches, means including a ring engaging all of the coupling members, and a spring acting on the ring to urge the coupling members toward the notches.

14. A torque transmitting coupling comprising coaxial rotatable driving and driven members, one of the members being formed with circumferentially spaced groups of driving notches with the notches in each group spaced different distances than the groups, the other member being formed with a plurality of guide passages spaced the same as the notches to register with the notches in a number of relative positions equal to the number of groups, coupling members movably mounted in the passages to engage the notches, cam members engaging the coupling members to urge them toward the notches, the cam and coupling members being formed with cam surfaces providing different effective cam angles in different positions, a ring engaging the cam members, and a spring acting on the ring.

15. A torque transmitting coupling comprising coaxial driving and driven members, one of the members being formed with a plurality of circumferentially spaced guide passages and the other being formed with a plurality of similarly spaced cam notches, coupling members movably mounted in the passages to engage the notches, and resilient means urging the coupling members toward the notches, the passages lying at an angle measured circumferentially to radii therethrough whereby a greater torque is required to disengage the balls from the notches in one direction of torque than in the other.

ADIEL Y. DODGE.

REFERENCES CITED

The following references are of record in the file of this patent:

UNITED STATES PATENTS

| Number | Name | Date |
|---|---|---|
| 1,105,408 | Dechamps | July 28, 1914 |
| 1,386,272 | Morse | Aug. 2, 1921 |
| 1,479,706 | Fleischer | Jan. 1, 1924 |
| 1,657,274 | Niedhammer | Jan. 24, 1928 |
| 2,238,583 | Dodge | Apr. 15, 1941 |
| 2,429,091 | Dodge et al. | Oct. 14, 1947 |